Sept. 16, 1952     L. J. HARRISS ET AL     2,610,589
CRUST ROLLING APPARATUS
Filed Feb. 8, 1947     6 Sheets-Sheet 1

Inventors
Lloyd J. Harriss
Bernard Lambers

Sept. 16, 1952     L. J. HARRISS ET AL     2,610,589
CRUST ROLLING APPARATUS Filed Feb. 8, 1947     6 Sheets—Sheet 5

Inventors
Lloyd J. Harriss
Bernard Lambers
By: Spencer, Marzall,
Johnston & Cook
Att'ys Patented Sept. 16, 1952

2,610,589

UNITED STATES PATENT OFFICE 2,610,589

CRUST ROLLING APPARATUS

Lloyd J. Harriss, Kenilworth, and Bernard Lambers, Oak Park, Ill.; said Lambers assignor to said Harriss Application February 8, 1947, Serial No. 727,376

11 Claims. (Cl. 107—12)

This invention relates in general to an apparatus for supplying a dough sheet component to a pastry product and is particularly concerned with the forming and depositing of a crust to a pie. While the apparatus herein disclosed is particularly concerned with the supplying of a bottom crust to a pie receptacle, it is also applicable for the forming and placing of a top crust to such a pastry product.

The principal object of the invention is to provide a new and improved type of machine or apparatus for automatically forming and applying a pastry dough sheet, such as a pie crust, to a pastry receptacle.

Another object is to provide an apparatus for automatically forming and applying a pastry dough sheet, such as a pie crust, to a pastry or a receptacle therefor, particularly while the latter is being carried by a conveyor system.

A further object is to provide a machine or apparatus wherein reciprocating rollers are used to roll and apply a pastry dough sheet, such as a pie crust, to a pastry or a receptacle therefor and particularly while the latter is being carried by a conveyor system.

Still another object is to provide an apparatus wherein reciprocating rollers receive a dough mass and roll the mass into a pastry dough sheet as they are being reciprocated, so that when the rollers reach one extreme position, the dough will have been rolled into sheet form and will be allowed to drop downwardly onto a receptacle positioned therebelow.

A still further object is to provide an apparatus wherein reciprocating rollers are provided with drive means operating in timed relation with an intermittently moving conveyor system, whereby the rollers will receive a dough mass in one position thereof and will roll the mass into sheet form as they are being moved to the other extreme position, which dough sheet will be allowed to drop downwardly onto a receptacle carried by the conveyor system and which has come to rest below the rollers.

Other objects and advantages of the invention will become apparent upon reading the following description taken in conjunction with the accompanying drawings in which.

Briefly described, the apparatus of the present invention utilizes a movable or reciprocating frame which is open at the bottom thereof and which carries a pair of rollers mounted for rotation during reciprocation of the frame. An open stationary frame is provided on which the reciprocating frame moves and is provided with means adapted to cooperate with the rollers so that they may be rotated particularly when the movable frame moves toward its dispensing position.

Automatic means may be provided to supply a dough mass to the rollers when they reach one extreme position, whereupon the rotation of the rollers as they move to dispensing position will roll the dough mass into sheet form. The rollers are so positioned relative to each other that the dough sheet component of the pastry product which has been formed by the rollers will drop downwardly through the open bottom of the frame and will thus be properly disposed on the pastry receptacle while the rollers are still moving.

Figure 1:
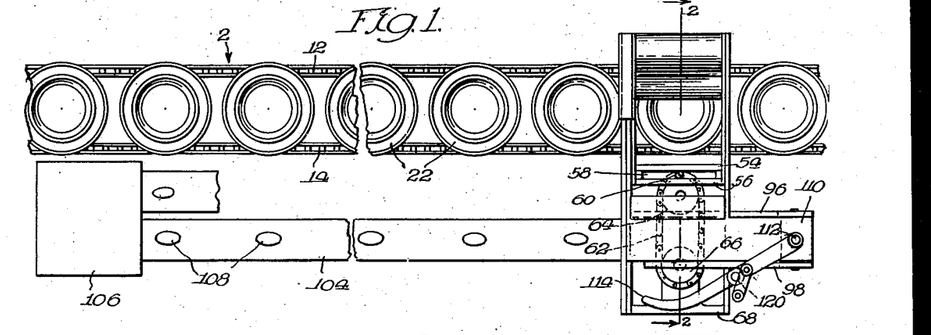
Fig. 1 is a plan view of the apparatus shown in conjunction with the conveyor system.
Figures 2, 3:
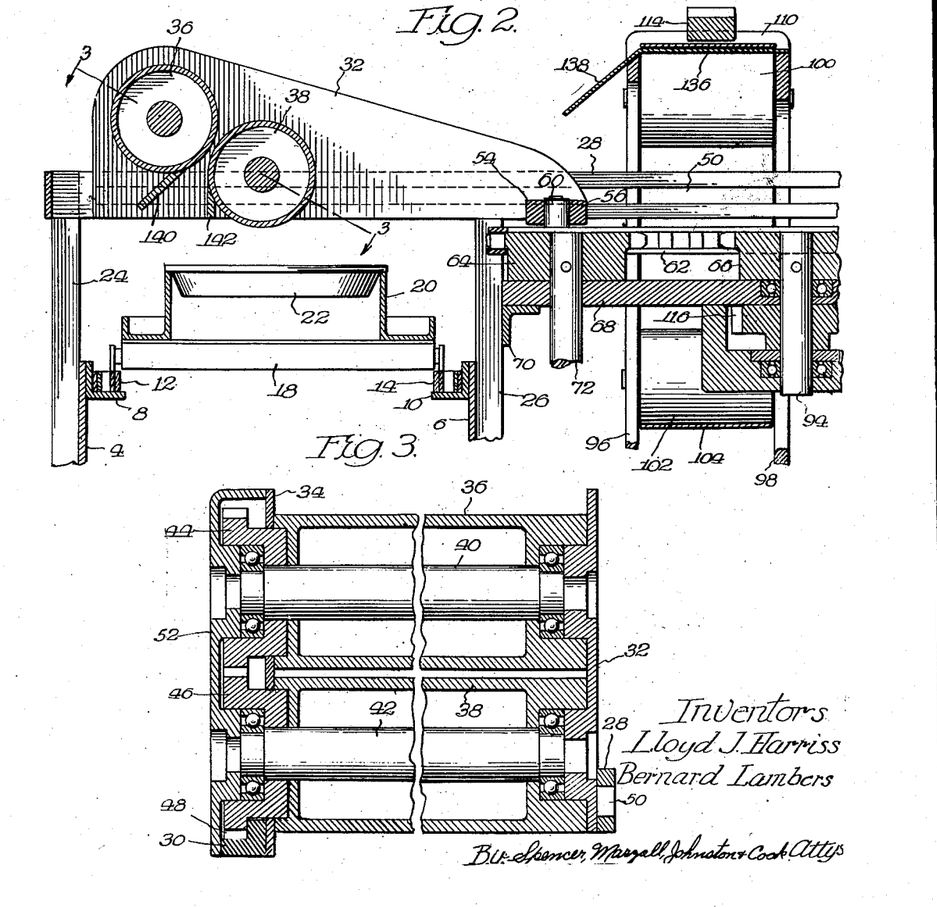
Fig. 2 is an enlarged vertical longitudinal sectional view through the apparatus taken substantially along the plane of line 2—2 of Fig. 1.
Fig. 3 is a longitudinal sectional view through the reciprocating rollers and taken substantially along the plane of line 3—3 of Fig. 2.

Referring now more particularly to the drawings, and especially to Figs. 1 and 2, the conveyor system is indicated generally by the numeral 2 and is preferably driven intermittently by any suitable drive means, not shown. The conveyor may be any well known and suitable construction and may comprise spaced upwardly extending side members 4 and 6 to which the angle bars 8 and 10 may be secured. Suitable chains or link belts 12 and 14 may be adapted to be moved along the horizontally extending legs of the angles 8 and 10. A main drive shaft 16 may be connected to the conveyor and to any suitable drive means, not shown, for the purpose of intermittently moving the chains or link belts 12 and 14. Spaced horizontal supports 18 extend between and are secured to the belts 12 and 14 and are adapted to support the upwardly extending supporting members 20 which are so constructed as to carry a plurality of spaced pastry receptacles such as the pie pans 22.

The apparatus of the present invention may be applied at any suitable point along the length of the conveyor and may be utilized in combination with other machines which perform different steps in the manufacture of the completed pastry product. Thus, after the present machine supplies the bottom crust to a pie, other machines may be located along the conveyor for performing such operations as supplying the pie filling, moistening the crust and applying the top crust thereto.

The drawings illustrate the preferred embodiment of the present invention and may comprise the spaced vertical supports 24 and 26 adapted to support the stationary frame comprising the tracks 28 and 30. The movable frame which is adapted to be supported by said stationary frame and to be reciprocated thereon may comprise the spaced side frame members 32 and 34 which are adapted to rotatably support the two rollers 36 and 38. The roller 36 is mounted on a shaft 40 which is suitably journaled in the side members by means of roller bearings, and the roller 38 is likewise mounted on the shaft 42 also suitably journaled in roller bearings between the sides of the movable frame. The shaft 40 is preferably provided at one end thereof with a gear 44 which is adapted to be in mesh with a similar gear 46 mounted on the end of the shaft 42 carrying the roller 38. A rack 48 extends along the supporting member 30 of the stationary frame and is adapted to have the gear 46 in mesh therewith so that as the movable frame reciprocates throughout the length of the stationary frame, the gear 46 in mesh with the rack 48 will be caused to rotate and will in turn also rotate the gear 44 on the shaft 40 which carries the roller 36. Thus it will be evident that reciprocation of the movable frame will cause a rotation of the two rollers 36 and 38.

The opposite side 28 of the stationary frame is composed of two vertically spaced members providing an elongated slot 50 therebetween adapted to receive any suitable supporting means such as 52 (see Fig. 5) so that the movable frame may be adequately supported and balanced at both sides.

It will be evident that the reciprocating frame may be moved by hand if so desired, and the dough mass may be fed to the rollers also by hand and the operation thereof may be effected in this way. The invention, however, also contemplates the utilization of automatic means for reciprocating the movable frame and, while such means may assume any number of desired specific forms, the one which is preferred and which has proven most practical in actual practice, includes an endless chain or link belt suitably connected to the movable frame to reciprocate the frame as the belt is driven. To accomplish this, reference will be made to Fig. 4, wherein it will be seen that the movable or reciprocating frame is provided at one end thereof with spaced members 54 and 56 extending between the sides of the frame to thereby provide an elongated slot 58. A pin or roller 60 suitably mounted on the chain or link belt 62 is adapted to be received within the slot 58, so that as the chain 62 is driven, the pin or roller 60 will traverse the slot 58 and will move the reciprocating frame between its two extreme positions.

Figure 4:
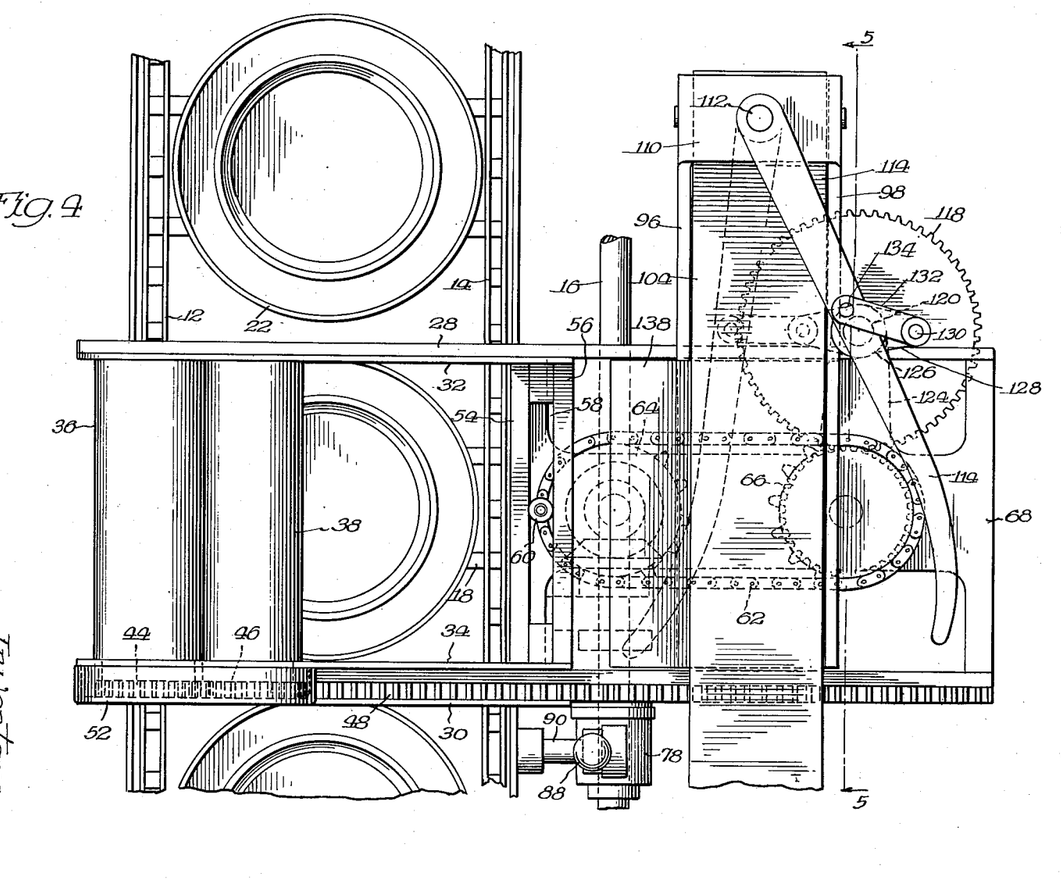
Fig. 4 is an enlarged plan view of the apparatus.

A driving sprocket 64 is adapted to have the chain 62 in mesh with the teeth thereon, while the idler sprocket 66 is in mesh with the chain 62 at the other end whereby the chain is supported and driven to reciprocate the movable frame.

A bracket 68 is located below the stationary frame, is secured at its outer end to the stationary frame and has its inner end resting upon or secured to a suitable angle member 70 fastened to the supporting member 26. The bracket 68 is utilized as a support and journaling means for the shafts on which the two sprockets 64 and 66 are mounted. The sprocket 64 is keyed or otherwise secured to the vertical shaft 72 which extends downwardly and is provided at its lower end with a bevel gear 74 (see Fig. 5). A second bevel gear 76 freely mounted on the main drive shaft 16 is adapted to be in mesh with the bevel gear 74 and a suitable clutching mechanism may be provided for the purpose of connecting the two gears 74 and 76 for operating the machine.

Figure 5:
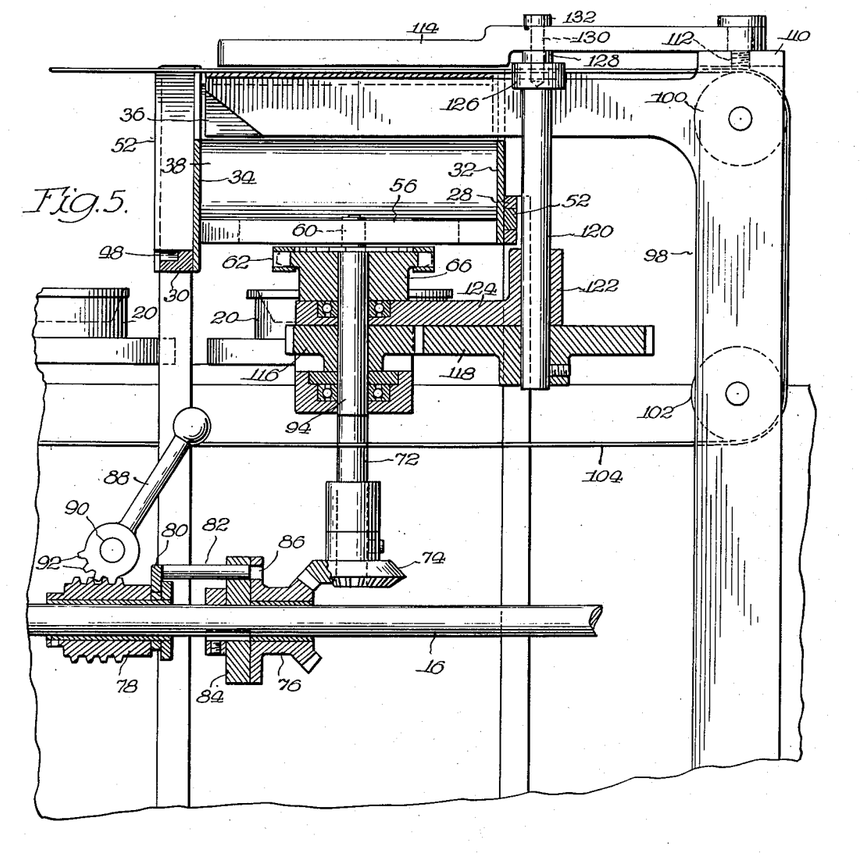
Fig. 5 is an end elevational view partly in section taken substantially along the plane of line 5—5 of Fig. 4.

This clutching mechanism may assume any one of a number of specific forms, the one disclosed herein being merely for illustrative purposes. A toothed member 78 may be mounted on the main drive shaft 16 for sliding movement thereon, which member may have an annular groove adapted to receive the collar 80 which has the pin 82 extending outwardly therefrom. This pin 82 is adapted to be received within a hole in the collar 84 which is keyed or otherwise secured to the shaft 16 and is thus continually rotated. The member 78 may be moved lengthwise of the shaft 16 to permit the pin 82 to engage an opening 86 in the bevel gear 76, whereupon the rotation of the collar 84 will be imparted to the gear 76 and the gear 74, which in turn will rotate the shaft 72, the sprocket 64 and the chain 62.

Any suitable means may be provided to engage and disengage the clutching mechanism such, for example, as the lever arm 88 pivotally mounted on the pin 90 and which may have at its lower end a circular portion provided with teeth 92 adapted to be in mesh with the teeth on the member 78. Thus it will be evident that, viewing Fig. 5, a rotation of the lever arm 88 in a counterclockwise direction will move the clutching mechanism toward the right to engage the clutch and drivingly connect the gear 76 with the main drive shaft 16.

The main drive shaft being driven continuously, will therefore drive the sprocket 64 when the clutch is engaged to rotate the chain 62 and reciprocate the movable frame through the pin and slot arrangement 60 and 58. The sprocket 66 is mounted on the vertically extending shaft 94 which is also suitably journaled in the bracket 68 and supports the other end of the chain 62.

During operation of the machine, the movable frame carrying the rollers 36 and 38 will reciprocate between the two extreme positions, one of which may be called the dough receiving position and the other the sheet dispensing position. When the rollers reach the dough receiving position, a mass of dough may be fed thereto either manually or by any suitable automatic means operating in timed relation with the reciprocating movement of the rollers. A preferred form of automatic feeding mechanism for supplying dough masses to the rollers is illustrated herein and may comprise spaced supporting standards 96 and 98 positioned at one side of the apparatus and adapted to have upper and lower rollers 100 and 102 rotatably mounted thereon for the purpose of supporting an endless conveyor belt 104. Similar rollers will, of course, be located elsewhere (not shown) for supporting and suitably driving the belt 104. Fig. 1 of the drawings illustrates a commonly used mechanism consisting of a dough divider 106 into which a mass of dough may be placed and which will operate to divide the dough into individual masses 108 and deposit them on the conveyor belt 104. The dough masses are spaced apart a predetermined distance and the speed of the belt is such that a mass of dough will be properly positioned with respect to the rest of the apparatus so that it may be moved or pushed off of the conveyor and into the rollers at the time the rollers reach dough receiving position.

The supporting standards 96 and 98 are connected at their upper ends by means of a transversely extending plate 110 which supports a pivot pin 112 for pivotally mounting thereon a pusher arm 114. It will be noted that this arm 114 extends over the top of the upper run of the conveyor belt 104 and suitable mechanism is provided to actuate the pusher arm in timed relation with the reciprocating movement of the rollers 36 and 38 whereby a dough mass positioned in front of the arm will be pushed off of the belt and into the rollers.

Figure 6:
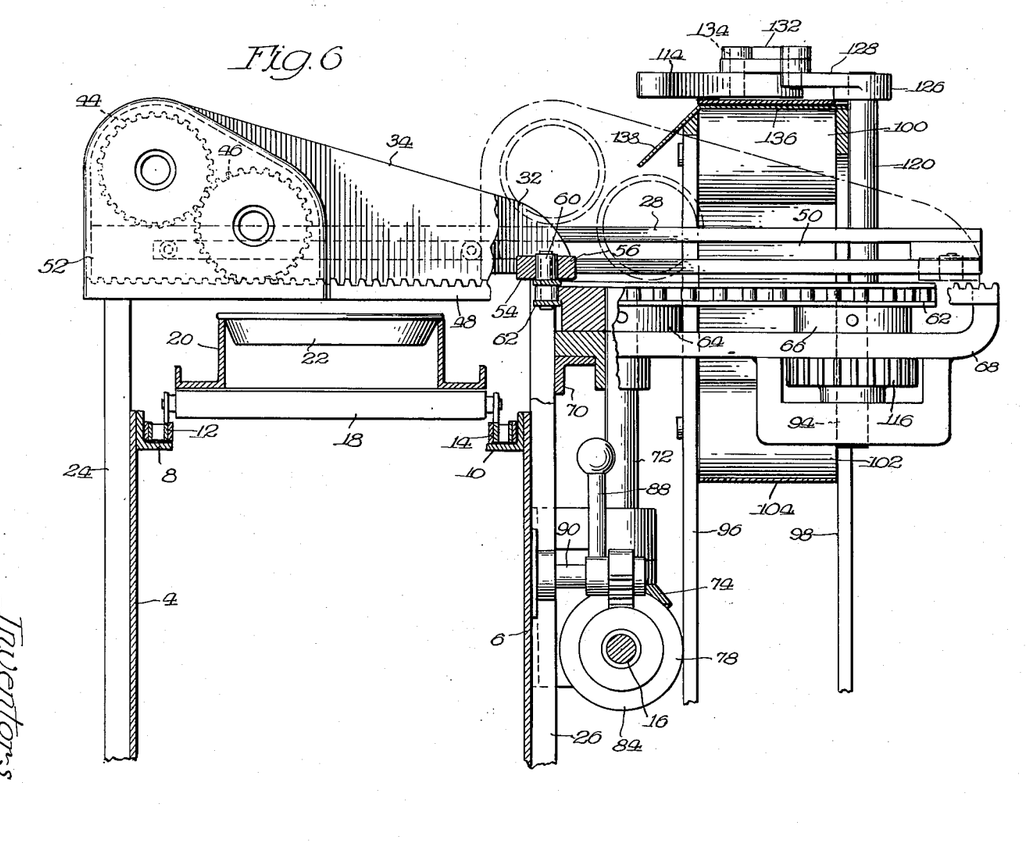
Fig. 6 is a side elevational view with certain parts broken away and shown in section to illustrate details.

The actuating mechanism for this arm may be more clearly understood by reference particularly to Figs. 4, 5 and 6 where it will be noted that a pinion 116 is keyed or otherwise suitably secured to the vertically extending shaft 94 and will rotate therewith. This pinion is in mesh with a gear 118 mounted on the shaft 120 which also extends vertically at one side of the apparatus. The shaft 120 is suitably journaled in a bearing 122 which may be made an integral part of an outwardly extending portion 124 of the bracket 68. A collar 126 is secured to the upper end of the shaft 120, which collar has integral therewith an outwardly extending arm 128 adapted to support a pivot pin 130 for pivotally connecting thereto one end of an arm or link 132. The other end of the link is pivotally mounted to the pusher arm 114 by means of the pivot pin 134.

It will thus be evident that rotation of the vertical shaft 72, which is driven from the main drive shaft 16, will rotate the shaft 94 through the connection therewith of the two sprocket wheels 64 and 66 and the chain 62. Rotation of the shaft 94, through the pinion 116 and gear 118, will rotate the vertical shaft 120 and the collar 126 secured thereto. Rotation of the collar and its arm 128 will then impart a reciprocating movement to the pusher arm 114 through the medium of the link 132. Since the same drive means is utilized to reciprocate the movable frame on which the rollers 36 and 38 are mounted and to reciprocate the pusher arm 114, the operation thereof can be synchronized so that the pusher arm will move forwardly to deposit a mass of dough from the conveyor belt into the rollers at the time they reach dough receiving position, as indicated by the dotted line position of the movable frame shown in Fig. 6.

A supporting plate 136 may extend between the frame members 96 and 98 below the upper run of the conveyor belt 104 and terminate in a downwardly extending inclined chute 138. This chute is adapted to terminate adjacent the space between the two rollers 36 and 38 when in their dough receiving position, so that a dough mass which has been removed from the conveyor belt by means of the pusher arm 114 will slide down the chute 138 and between the rollers 36 and 38.

From this position of the movable frame, it will then be moved in the opposite direction through the driving mechanism which includes the chain 62. Viewing the machine as illustrated in Fig. 6, as the frame moves toward the left from the dotted line position to the full line or dispensing position, the gear 46 secured to the roller 38 will be in mesh with the rack 48 and will be rotated in a counter-clockwise direction. At the same time the roller 36 will be rotated in a clockwise direction through the meshing of its gear 44 with the gear 46. The rotation of these two rollers will thus operate to roll the dough mass received thereby into sheet form, which sheet will be forced outwardly between the rollers and will extend downwardly through the open bottom of the moving frame. By this time, the intermittently moving conveyor will have come to rest in a position such that one of the pastry receptacles 22 will be located immediately below the two rollers. The bottom or leading edge of the sheet being rolled will be intercepted by the edge of the receptacle, and as the movable frame continues and the rollers continue to roll and eject a sheet, it will be gradually deposited on the receptacle. The edge which finally leaves the rollers will lie across the outer edge of the receptacle, thus insuring that the entire dough sheet component will be properly dispensed and located on the receptacle.

Suitable scraper elements 140 and 142 may be located adjacent and lengthwise of the respective rollers 36 and 38 for the purpose of scraping the rollers and preventing any excess dough from remaining thereon, as well as preventing the rolled dough sheet from sticking to the rollers. This will insure the proper dispensing of the dough sheet onto the receptacle.

Figure 7:
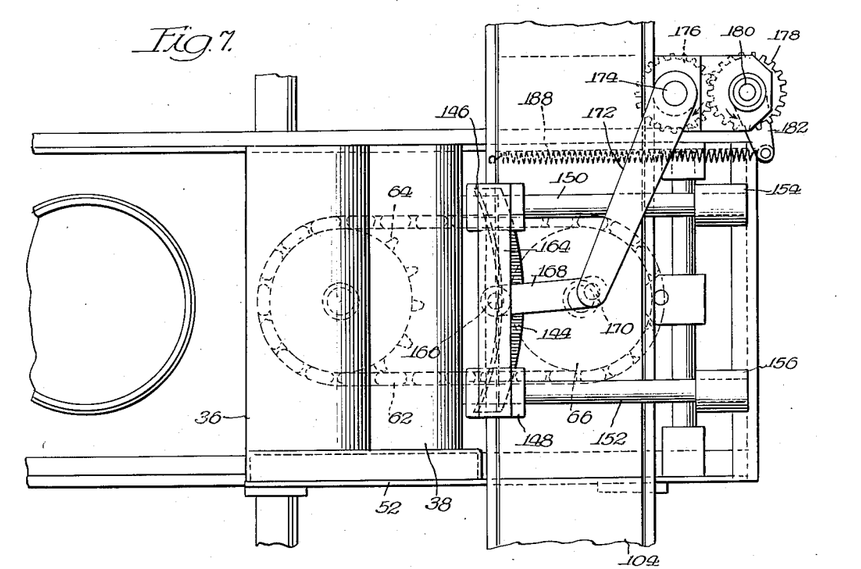
Fig. 7 is a fragmentary plan view similar to Fig. 4 but showing a modified form of the device.
Figure 8:
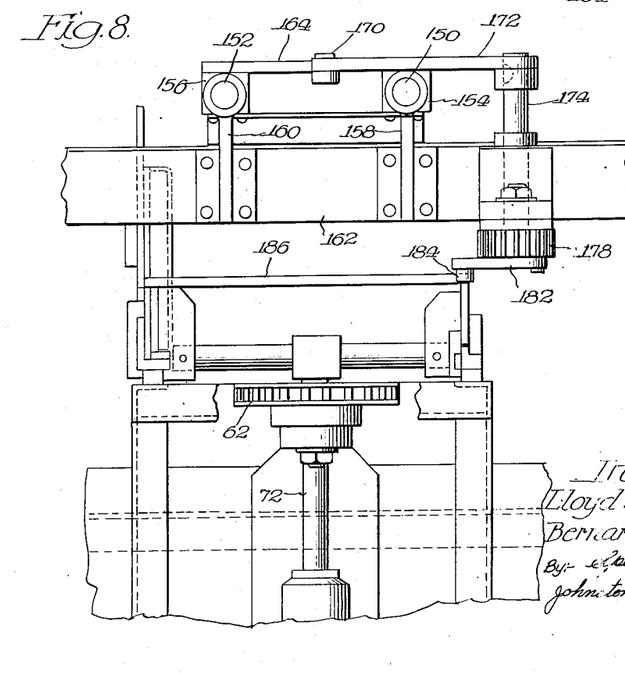
Fig. 8 is an end elevational view of the mechanism shown in Fig. 7.
Figure 9:
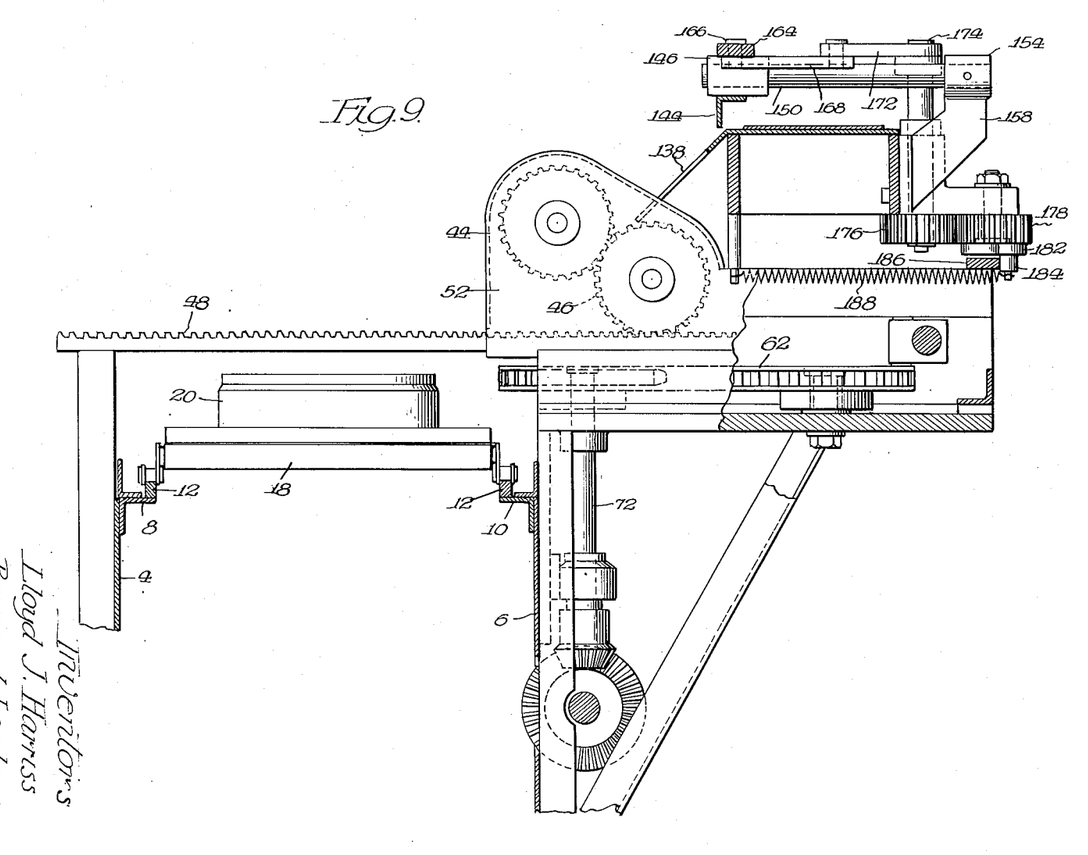
Fig. 9 is a side elevational view thereof.

Referring now to Figs. 7, 8 and 9 where a modified form of the device is illustrated, the pusher element 144 which pushes the dough masses into the rollers has an arcuate configuration and has bearing members 146 and 148 mounted at each end thereof. These bearing members are adapted to slide longitudinally on the rods 150 and 152 which extend rearwardly of the machine and are supported at their rear ends in bearings 154 and 156, which bearings are suitably supported by means of brackets 158 and 160 suitably mounted on a stationary part of the machine such as 162.

The slidable bearings 146 and 148 are connected together by means of a cross member 164 which has a pivot pin 166 mounted thereon adapted to pivotally support one end of a link 168. The opposite end of this link is pivoted as at 170 to an arm 172 extending outwardly toward one side of the device and is secured at its outer end to a vertically extending rotatable shaft 174.

The vertical shaft 174 has a gear 176 mounted thereon and adapted to be in mesh with a similar gear 178 mounted adjacent thereto on a vertical shaft 180. Rotation of the gear 178 will cause a rotation in the opposite direction of the gear 176, which will thus carry with it the shaft 174 to cause a rotation of the arm 172. The rotation of the arm 172 will be of a reciprocating nature and will thus reciprocate the pusher bar 144 across the conveyor 104 in a synchronized movement therewith so as to deposit a dough mass into the rollers 36 and 38.

The timing of this movement is achieved through the medium of an arm 182 secured to the gear 178. The outer end of this arm carries a roller 184 adapted to be contacted by a cross bar 186 extending between the sides of the movable frame carrying the rollers. A coiled tension spring 188 is secured at one end to the arm 182 and at its other end to any suitable stationary part of the machine so as to normally maintain the arm in a position opposite to that shown in Fig. 7.

Thus, when the rollers 36 and 38 have received a dough mass in their position illustrated in Fig. 7, they will then begin their movement toward the conveyor carrying the pastry receptacles. As this movement occurs, the cross bar 186 moves with the frame and relieves the tension against the spring 188 which pulls the arm 182 in a clockwise direction as viewed in Fig. 7. This movement of the arm 182 will carry with it the gears 178 and 176 thus causing a rotation of the arm 172 in a counter-clockwise direction to withdraw the pusher bar 144 to its rearmost position. In this position the conveyor 194 will be free to carry the next succeeding dough mass into a position in front of the pusher bar, and when the movable carrier is moved to dough receiving position, the bar 186 will contact the roller 184 and rotate the gears in the opposite direction to move the pusher forwardly.

It will thus be evident that a novel form of apparatus has been provided for forming and dispensing a dough sheet component onto a pastry or a receptacle therefor. One of the important features of the invention is the capability of the apparatus for dispensing a dough sheet as it is being rolled. That is to say, the sheet is not rolled in its entirety and then transferred to the receptacle, but rather, the location and movability of the rollers is such that the sheet will be dispensed during the rolling operation so that when the rolling of the sheet is completed, it will have been properly placed on the receptacle. This permits the operation to be performed in much less time.

It will be evident also that other mechanism may be utilized for carrying out the objects of the invention than that which has been specifically disclosed herein. Changes may be made in the form, construction and arrangement of parts from that disclosed herein without in any way departing from the spirit of the invention or sacrificing any of the attendant advantages thereof, provided that the changes fall within the scope of the claims appended hereto.

Having thus described our invention what we claim as new and desire to secure by Letters Patent of the United States is:

1. Apparatus for supplying a dough sheet component for a pastry product to a receptacle therefor, comprising a pair of rollers for rolling the dough into a sheet, a stationary dough receiving position and a sheet dispensing position in spaced relation, a track extending therebetween, a reciprocating frame for rotatably supporting said rollers, means for moving said frame and rollers along said track to dough receiving and sheet depositing positions, and cooperating means on said rollers and frame for rotating said rollers as said frame is reciprocated, whereby the dough received thereby is rolled into a sheet by the time said frame reaches sheet depositing position.

2. Apparatus for supplying a dough sheet component for a pastry product to a receptacle therefor, comprising a pair of rollers for rolling the dough into a sheet, a frame for rotatably supporting said rollers, a track adjacent said frame, means for reciprocating said frame on said track, and means on said track in direct contact with said rollers, whereby reciprocation of said frame will rotate said rollers to roll dough received thereby into a sheet and deposit the sheet on said receptacle.

3. Apparatus for supplying a dough sheet component for a pastry product to a receptacle therefor, comprising a pair of rollers for rolling the dough into a sheet, movable means for rotatably supporting said rollers, a frame for movably supporting said roller supporting means, a rack on said frame, meshing gears on said rollers, one of which is in mesh with said rack, whereby dough received by said rollers will be rolled into a sheet upon movement of said roller supporting means on said frame.

4. Apparatus for supplying a dough sheet component for a pastry product to a receptacle therefor, comprising a pair of rollers for rolling the dough into a sheet, a stationary dough receiving position and a sheet dispensing position in spaced relation, a track extending therebetween, means for reciprocating said rollers to dough receiving and sheet dispensing positions, means operable in timed relation with said reciprocating means for supplying a mass of dough to said rollers when in dough receiving position, and means for rotating said rollers as they move to sheet dispensing position, whereby the dough received thereby will be rolled into a sheet and dispensed.

5. Apparatus for supplying a dough sheet component for a pastry product to a receptacle therefor, comprising a pair of rollers for rolling the dough into a sheet, a stationary dough receiving position and a sheet dispensing position in spaced relation, a track extending therebetween, an open-bottomed reciprocable frame for rotatably supporting said rollers, and cooperating means on said rollers and frame for rotating said rollers during reciprocation thereof, whereby dough received by the rollers will be rolled into a sheet during movement of said frame, which sheet will drop through the open bottom of said frame onto a receptacle located thereunder.

6. Apparatus for supplying a dough sheet component for a pastry product to a receptacle therefor, comprising a pair of rollers for rolling the dough into a sheet, a stationary dough receiving position and a sheet dispensing position in spaced relation, a track extending therebetween, an open-bottomed reciprocable frame for rotatably supporting said rollers, means for rotating said rollers during reciprocation of said frame from dough receiving to sheet dispensing positions, whereby dough received by said rollers will be rolled into a sheet and dropped through the open bottom of said frame onto a receptacle thereunder when said frame reaches dispensing position, and mechanism for automatically supplying a dough mass to said rollers each time they reach dough receiving position.

7. A device for supplying a sheet component to a pastry receptacle while the latter is being carried on a conveyor system, said device comprising a pair of rollers for forming the sheet component, means for reciprocating said rollers between two extreme positions wherein one of said positions is directly over a pastry receptacle, means for rotating said rollers as they are moved toward the receptacle, a plurality of individual dough masses also on the conveyor system, and means operable in timed relation with the reciprocation of said rollers to remove a dough mass from the conveyor and deposit same between said rollers, whereby material received by said rollers will be formed into a sheet and will be deposited on a receptacle when the rollers reach a position directly thereover.

8. A device for supplying a dough sheet component to pastry receptacle while the latter is being carried on a conveyor system, said device comprising a pair of rollers for rolling the dough into sheet form, a stationary dough receiving position and a sheet dispensing position in spaced relation, a track extending therebetween, means for reciprocating said rollers between dough receiving position and sheet dispensing position above the pastry receptacle, a plurality of individual dough masses also on said conveyor system and movable therewith, mechanism for automatically supplying a dough mass to said rollers from the conveyor when the rollers reach dough receiving position, and means for rotating said rollers as they are moved toward sheet dispensing position, whereby the dough mass will be rolled into a sheet and deposited on a receptacle when the rollers reach sheet dispensing position.

9. Apparatus for supplying a dough sheet component for a pastry product to a receptacle therefor, comprising means for forming a mass of dough into a sheet, a stationary dough receiving position and a sheet dispensing position in spaced relation, a track extending therebetween, means for moving said sheet forming means over said track between said receiving and dispensing positions, means to actuate said sheet forming means as it is being moved to depositing position, whereby the sheet will be formed and deposited on the receptacle when the sheet forming means reaches depositing position.

10. Apparatus for supplying a dough sheet component for a pastry product to a receptacle therefor, comprisng means for forming a mass of dough into a sheet, a stationary dough receiving position and a sheet dispensing position in spaced relation, means for moving said sheet forming means between said receiving and dispensing positions, means to actuate said sheet forming means as it is being moved to depositing position, whereby the sheet will be formed and deposited on the receptacle when the sheet forming means reaches depositing position.

11. Apparatus for supplying a dough sheet component for a pastry product to a receptacle therefor, comprising means for forming a mass of dough into a sheet, a stationary dough receiving position and a sheet dispensing position in spaced relation, means for automatically supplying a dough mass to said first-named means in dough receiving position, means for moving said sheet forming means between said receiving and dispensing positions, means to actuate said sheet forming means as it is being moved to depositing position, whereby the sheet will be formed and deposited on the receptacle when the sheet forming means reaches depositing position.

LLOYD J. HARRISS.
BERNARD LAMBERS.

REFERENCES CITED

The following references are of record in the file of this patent:

UNITED STATES PATENTS

| Number | Name | Date |
| --- | --- | --- |
| 89,653 | Goodwin et al. | May 4, 1869 |
| 128,333 | Snow | June 25, 1872 |
| 657,227 | Stewart | Sept. 4, 1900 |
| 1,328,025 | Wheeler | Jan. 13, 1920 |
| 1,482,195 | Kern et al. | Jan. 29, 1924 |
| 2,101,621 | Maas | Dec. 7, 1937 |
| 2,160,783 | McDonald | May 30, 1939 |

FOREIGN PATENTS

| Number | Country | Date |
| --- | --- | --- |
| 507,859 | Great Britain | June 22, 1939 |